US008321156B2

(12) United States Patent  (10) Patent No.: US 8,321,156 B2
McGinley  (45) Date of Patent: Nov. 27, 2012

(54) ODOR INSPECTION SYSTEM

(76) Inventor: Charles M. McGinley, Stillwater, MN (US)

( * ) Notice: Subject to any disclaimer, the term of this patent is extended or adjusted under 35 U.S.C. 154(b) by 346 days.

(21) Appl. No.: 12/798,399

(22) Filed: Apr. 5, 2010

(65) Prior Publication Data

US 2010/0262614 A1  Oct. 14, 2010

Related U.S. Application Data

(60) Provisional application No. 61/212,253, filed on Apr. 10, 2009.

(51) Int. Cl.
*G06F 17/30* (2006.01)
(52) U.S. Cl. .......................................... 702/24
(58) Field of Classification Search ..................... 702/24
See application file for complete search history.

(56) References Cited

OTHER PUBLICATIONS

A.Yuwono and P. Schulze Lammers, Odor Pollution in the Environment and the Detection Instrumentation, Agricultural Engineering International: the CIGR Journal of Scientific Research and Development. Invited Overview Paper. vol. VI. Jul. 2004, p. 1-33.*

* cited by examiner

*Primary Examiner* — Tung S Lau
(74) *Attorney, Agent, or Firm* — Jacobson and Johnson

(57) ABSTRACT

Readings of odorous air concentration or strength are taken at various locations in the vicinity of a site being monitored for odorous air and are entered into an electronic database and electronically combined with a map of the vicinity of the site to produce a visual pattern of the odorous air with respect to the site. Readings may further include meteorological data, odor descriptors, time and date, and the like and some of the readings may be transformed into symbolic form for visual display on the map. Preferably the map is an Internet accessible on-line map.

20 Claims, 1 Drawing Sheet

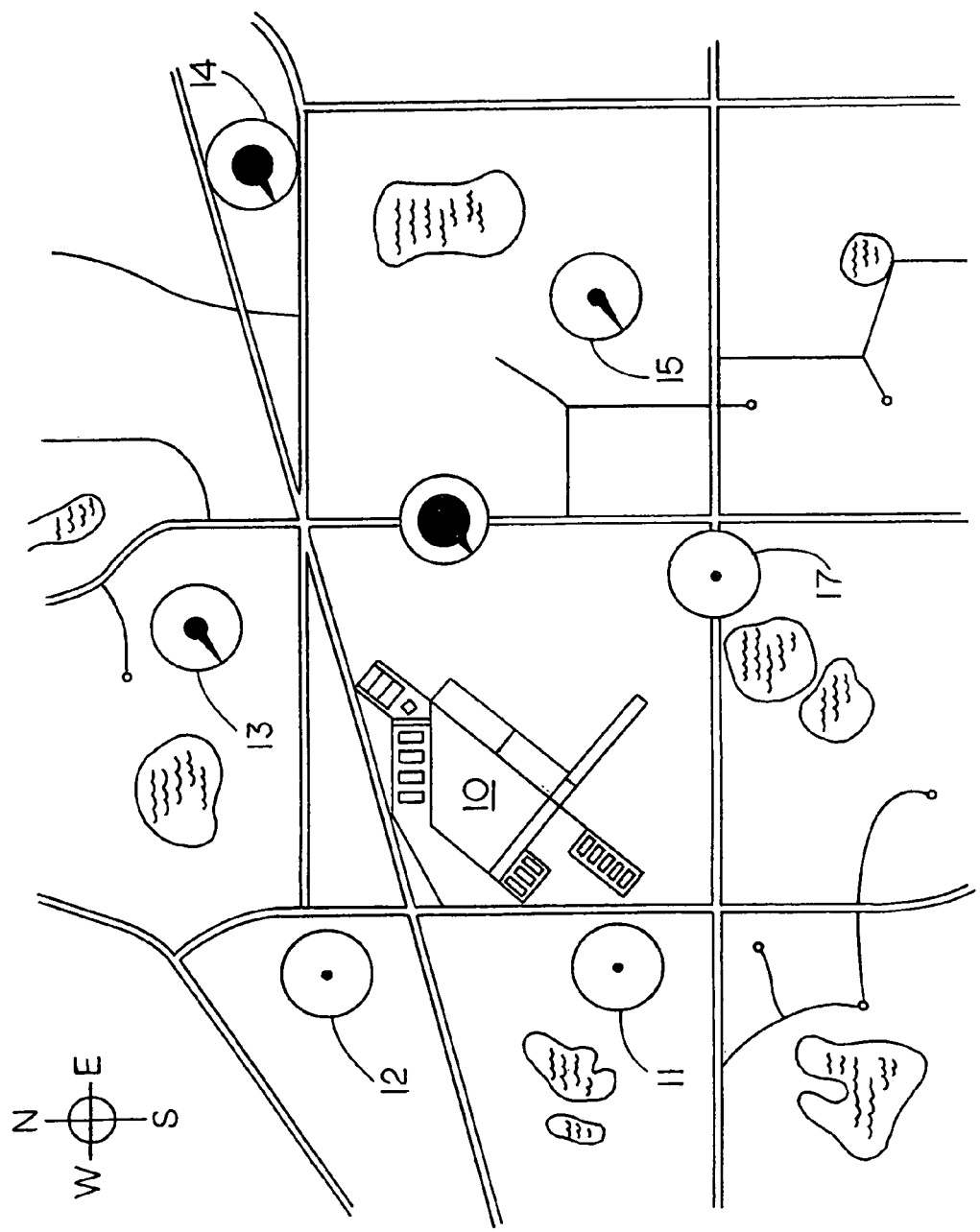

ODOR INSPECTION SYSTEM

CROSS REFERENCE TO RELATED APPLICATIONS

This application claims priority to currently pending U.S. Provisional Application Ser. No. 61/212,253; filed on Apr. 10, 2009; titled ODOR INSPECTION SYSTEM.

FIELD OF THE INVENTION

This invention relates to odorous air affecting air quality control or air pollution. More specifically, the invention relates to monitoring a site for odorous air, or lack thereof, and providing a visual display of the pattern and strength of odorous air in the area of the monitored site along with other pertinent information.

DESCRIPTION OF THE PRIOR ART

U.S. Pat. Nos. 6,595,037, 6,018,984, 3,902,851 and references cited and/or identified therein explain and describe in some detail the advent of odor detection and measurement as part of the concern for reducing and minimizing odorous air pollution as well as explaining and describing the operation and use of olfactometers to detect and measure the severity of noxious and obnoxious smells and odors which contribute to air pollution. For those purposes the prior art identified above is incorporated herein by reference.

Early odor detecting and/or measuring devices, such as shown and described in the above-identified '984 patent, were large scale laboratory devices so that air samples from a site being tested had to be brought in suitable containers to where the test machine was located to identify the nature or type of odor and to measure it's concentration which is conventionally known as D/T or "Dilution to Threshold" ratio. More recently testing for and measuring odors has been significantly enhanced by the development of a portable olfactometer such as described in the '037 patent and which is commercially available under the trademarked name of Nasal Ranger, a product of St. Croix Sensory, Inc. located in Lake Elmo, Minn. As a result, data of odorous air in the vicinity of the site under observation can be determined on site at various locations in the vicinity of the site. This not only provides more accurate data but also provides means for monitoring the site, which is under observation. The data concerning the air being tested can be pinpointed as to where the testing took place with respect to the site under observation and the data and location of the data can then be recorded and tabulated onto a suitable data sheet. This test information in the form of the tabulated data could then be looked at and used to analyze the nature and degree of the pollution caused by the odorous air. However, it did not give the observer a visual display of the pattern that the odorous air pollution makes with respect to the site being observed and nearby areas nor did it provide a visual display of the monitoring of the site for use in visually comparing the odorous air patterns over a period of time.

BRIEF SUMMARY OF THE INVENTION

Obnoxious or bothersome odors, some of which can be harmful, have caused various groups such as municipalities, private parties, sewer districts and other governmental agencies and animal or agriculture related businesses to become concerned with the extent and potential effect of these odors and what can be done to eliminate them or at least minimize their effect. The invention provides the concerned party a visual display of the pattern of odorous air with respect to a selected or designated site so that it's effect can be determined and if corrective action is needed and what corrective action should be taken.

Also, some governmental agencies have promulgated regulations governing air quality. As an example, the state of Colorado has developed an air quality regulation concerning the operation of swine feeding operations. In part, the regulation requires certain commercial swine feeding operations to obtain a permit, which requires the operation to minimize off-site odor emissions. Compliance is measured, in part, by two odor concentration standards, one with respect to the operation's boundary and beyond and the other with respect to an odor receptor, such as an occupied dwelling or school or the like. This invention provides a system for accurately monitoring these types of operations to ensure that they are complying with the regulations.

In observing or testing a site for pollution caused by odorous air (or for the absence of such pollution), data that relates to and what may be important or of interest in analyzing or determining the effect of the pollution is collected in the vicinity of the site. Hereinafter, this will generally be referred to as odor inspection data. The odor inspection data generally includes the concentration (D/T) of the detected odor, as measured by the olfactometer, the location where the measurement was made as well as other contributing factors such as meteorological conditions, time of day and the nature of the detected odor, sometimes referred to as a descriptor which may range from manure to food processing odors. When the odor inspection data is combined in total or in part for analysis or for observation, it is generally referred to as odor inspection information.

According to the teachings of the instant invention, the odor inspection data of a site, as compiled by the observer or tester, is entered into an electronic database and selected odor inspection data from the database is electronically combined with a visual map of an area in the vicinity of the site for visually displaying odor inspection information of the site.

As a further feature of the invention, some of the data in the database is transformed into symbols for placing on the visual map to assist in providing the observer with a better overall view of the pattern and strength of the odorous air.

Yet another feature of the invention is that the visual display is Internet accessible on-line for on site viewing.

BRIEF DESCRIPTION OF THE DRAWINGS

FIG. 1 shows an example of a drawing of topographical map containing graphical form of odor inspection information for a site that has been monitored for odorous air.

DESCRIPTION OF THE PREFERRED EMBODIMENT

Step 1. Obtain Odor Inspection Data Site

The step of visually displaying odor inspection information of an area in the vicinity of a site starts with an inspector selecting various locations in the vicinity of a site. The inspector then uses a portable odor detecting and measuring device of the nature described in the aforementioned '037 patent, or similar, to determine the odor strength by determining the concentration at each of the selected locations of the site in question. A commercially available device for this purpose is the previously mentioned Nasal Ranger field olfactometer, a product of St. Croix Sensory, Inc. located in Lake Elmo, Minn.

At each of the selected locations in the vicinity of the site in question, the inspector may also use other measuring and testing devices such as commercially available meteorological equipments to take measurements of other data that may influence the significance of the odor readings. This data may include, but is not limited to, date and time of the measurements, the location where each measurement was made which may be identified, for example by latitude and longitude using a commercially available global positioning system (GPS) unit, meteorological conditions such as temperature, humidity, barometric pressure, precipitation, sky cover as well as wind strength and direction. The aforementioned data along with data taken from the portable odor detecting and measuring device is collectively referred to as odor inspection data.

At each of the selected locations in the area of the site in question the inspector records all of the acquired data on an odor monitoring data sheet. The sheet shown in Table 1 is only an example to illustrate the manner in which data is initially recorded.

TABLE 1

ODOR MONITORING DATA SHEET

| Time | Location | Odor Strength | Descriptor | Weather | Temperature | Wind Direction |
|------|----------|---------------|------------|---------|-------------|----------------|

When the odor inspection data has been recorded on the odor monitoring data sheet for all of the selected locations of the site in question and is ready for analysis or for observation, the content of the completed odor monitoring data sheet is generally referred to as the odor inspection information.

Step 2. Create Database Containing Odor Inspection Information

The data from the completed odor monitoring data sheet for the site in question is then transferred to an electronic database located in a computer or a server database. Transferring of the data from the completed odor monitoring data sheet to the electronic database may be done electronically, by hand, by verbal command but is not limited to the aforementioned. For example, the inspector may use a keyboard or the like to enter the data from the completed odor monitoring data sheet for the site in question into an electronic database located in a system's computer with the electronic database comprising a table of monitoring locations, which typically contains a listing of the location for each measurement or reading, the date, and gives each of the locations a designated reference decimal number and/or alpha numeric letter and combinations thereof.

Step 3. Process and Manipulate Odor Inspection Data Information from Database Using Dundas, KML, and Link Manipulated Odor Inspection Data Information to a Map Source In order to provide a visual presentation of the acquired data with respect to the site in question, the odor inspection information in the electronic database is then processed and manipulated by a user through the use of data visualization software(s) such as the data visualization software available under the trademarked name of DUNDAS DATA VISUALIZATION, a product of Dundas Data Visualization, Inc. located in Toronto, Ontario, Canada.

The data visualization software also functions to convert the odor inspection information from a numerical form into a graphical form (i.e. pictorial/symbol form). For example, a symbol may take the form of a yellow circle (symbolic of the sun) to visually indicate odor strength. The data visualization software may then modify the odor strength symbol to provide a visual indication of the relative odor strength at each location of the site in question. For example, the odor strength symbol may be modified by darker colors to produce different shadings ranging from no shading, as indication of no odor detected, to full shading indicating a very high concentration or strength of the odor. This is referred to as an "eclipse" symbol. Another example of a symbol is an arrow indicating the wind direction. The foregoing are examples, no limitation thereto being intended.

Once the odor inspection information has been processed by data visualization software to the user's desired specification, the processed odor inspection information is then placed on a pictorial or photographic reproduction of the area of the site in question. This is done by electronically converting the processed odor inspection information to an XML-based language schema for placement of the graphical form of the odor inspection information on existing or future Web-based, two-dimensional maps and three-dimensional Earth browsers such as Google Map and Google Earth, which are both Internet accessible on-line visual maps for producing an on-line visual display of the selected odor inspection data and are both products of Google Inc. located in Mountain View, Calif. An example of an acceptable XML-based language schema is the Keyhole Markup language (also known as KML). For example, the graphical form of the odor inspection information for the site area in question may be inserted on a map comprising an overhead or aerial view of the site area in question in the form of Google Earth with the monitoring or testing locations identified on the map by their numeric designations.

Referring to Table 2 and FIG. 1, FIG. 1 shows an example of a drawing of a topographical map, similar to those that may be obtained from Google Earth, containing graphical form of an odor inspection information for a site 10 that has been monitored for odorous air, or lack thereof.

The steps involve in obtaining the results of FIG. 1 starts with an inspector selecting various locations 11, 12, 13, 14, 15, 16, and 17 in the vicinity of site 10. The inspector then uses a portable odor detecting and measuring device of the nature described in the aforementioned '037 patent, or similar, to determine the odor strength by determining the concentration in the form of D/T or "Dilution to Threshold" ratio at each of the selected locations 11, 12, 13, 14, 15, 16, and 17 of site 10.

In the Example of FIG. 1, the inspector also recorded the observed or measured temperature, wind direction, descriptor and sky cover at each of the selected locations 11, 12, 13, 14, 15, 16, and 17 of site 10 on Table 2, which comprises an odor monitoring data sheet.

TABLE 2

ODOR MONITORING DATA SHEET

| Time | Location | Odor Strength | Descriptor | Weather | Temperature | Wind Direction |
|------|----------|---------------|------------|---------|-------------|----------------|
| 9:00 | 11 | No odor | | Cloudy | 70° F. | South West |
| 9:15 | 12 | No odor | | Cloudy | 70° F. | South West |
| 9:30 | 13 | 4-D/T | aromatic | Cloudy | 70° F. | South West |
| 9:45 | 14 | 7-D/T | aromatic | Cloudy | 70° F. | South West |
| 10:00 | 15 | 2-D/T | aromatic | Cloudy | 70° F. | South West |
| 10:15 | 16 | 15-D/T | Solvent | Cloudy | 70° F. | South West |
| 10:30 | 17 | No odor | | | 70° F. | South West |

When the odor inspection data has been completely recorded on Table 2 for all of the selected locations 11, 12, 13, 14, 15, 16, and 17 of the site 10 (which is now referred to as the odor inspection information) the information contained in Table 2 is then transferred to an electronic database located in a computer or a server database. The odor inspection information in the electronic database is then processed and manipulated by a user through the use of data visualization software(s). As shown in FIG. 1, the data visualization software has converted the odor inspection data information from a numerical form into a graphical form in which the odor strength symbol comprises different shadings within a circle, which are proportional to the strength of the odor. These range from negligible shading at locations 11, 12, and 17, small shading at location 15, medium shading at location 13, larger shading at location 14, and largest shading at location 16.

As further shown in FIG. 1 the data visualization software has also converted the odor inspection information from a numerical form into a graphical form for the wind direction comprising an arrow indicating in the wind direction, which in FIG. 1 is shown flowing from a southwest direction. It is noted that the foregoing are illustrative examples, no limitation thereto being intended. Other examples of symbols are a matter of choice and may include colors and/or geometrical shapes and/or combinations thereof.

I claim:

1. A method for visually displaying odor inspection information of an area in the vicinity of a site, comprising the steps of:
    (a) detecting and measuring odor inspection data at locations in the vicinity of a site; then
    (b) producing an electronic database by electronically tabulating and recording the odor inspection data from step (a); and
    (c) electronically combining selected odor inspection data contained in said database with a visual map of an area in the vicinity of said site for visually displaying the selected odor inspection data on said map.

2. The method as described in claim 1 wherein said selected odor inspection data includes said locations and odor strength measured at said locations.

3. The method as described in claim 2 wherein said selected odor inspection data further includes the time and date of the measured odor strength 4. The method as described in claim 2 wherein said selected odor inspection data includes meteorological data.

5. The method as described in claim 2 wherein said selected odor inspection data includes odor descriptors.

6. A method for visually displaying odor inspection data in the vicinity of a site, said method comprising the steps of:
    (a) detecting and measuring odor strength at selected locations in the vicinity of a site;
    (b) electronically tabulating and recording each detected odor strength and its location into a database;
    (c) transforming each odor strength recorded in said database into a pre-selected symbol visually indicating the relative strength of said recorded odors; then
    (d) electronically placing each of said recorded locations and said associated symbols onto a visual map of the vicinity of said site to produce a visual display of the symbolized recorded odors at their respective locations.

7. A method for displaying odor inspection data as described in claim 6, further including the steps of:
    (a) detecting and measuring wind direction at the odor detection locations;
    (b) electronically recording the detected wind direction into said database; then
    (c) transforming each detected wind direction in said database into a pre-selected symbol indicating the direction of the wind; and
    (d) electronically placing said wind symbols onto a visual map of the vicinity of said site at their respective locations.

8. The method for visually displaying odor inspection data as described in claim 7 wherein said wind direction locations correspond to the respective locations of each detected odor strength.

9. The method as described in claim 6 wherein step (d) said map is an Internet accessible on-line visual map for producing an on-line visual display of the symbolized recorded odors at their respective locations 10. The method as described in claim 1 wherein step (c) said selected odor inspection data is combined with an Internet accessible on-line visual map for producing an on-line visual display of the selected odor inspection data.

11. A method for providing odorous air inspection information for use in monitoring a site for odorous air, comprising the steps of:
    (a) detecting and measuring odorous air inspection data at locations in the vicinity of a monitored site; then
    (b) producing an electronic database by electronically tabulating and recording said detected odorous air inspection data; then
    (c) visually displaying at a map of selected odorous air inspection data contained in said database.

12. The method as described in claim 11 wherein said selected odorous air inspection data includes said locations and odor concentration measured at each of said locations.

13. The method as described in claim 12 wherein said selected odorous air inspection data includes the time and date of the measured odor concentration.

14. The method as described in claim 12 wherein said selected odorous air inspection data includes meteorological data.

15. The method as described in claim 12 wherein said selected odorous air inspection data includes odor descriptors.

16. The method as described in claim 11 wherein said selected odorous air inspection data is displayed by electronically combining the selected odorous air inspection data with a visual map of the vicinity of the monitored site.

17. The method as described in claim 16 wherein said map is an Internet accessible on-line map.

18. A method for providing odorous air inspection data for use in monitoring a site, said method comprising the steps of:
    (a) detecting and measuring odor concentration in the air at locations in the vicinity of a monitored site;
    (b) electronically tabulating and recording each detected odor concentration and its location into a database;
    (c) converting the odor concentration recorded in said database into a preselected symbol visually indicating the relative concentration of said recorded odor concentrations; and,
    (d) electronically placing each of said recorded locations and said associated symbols onto a visual map of the vicinity of said monitored site to produce a visual display of the symbolized recorded odor concentrations at their respective locations.

19. A method for displaying odorous air inspection data as described in claim 18, further including the steps of:
    (a) detecting and measuring wind direction at the respective detection locations;
    (b) electronically recording the detected wind direction into said database; then,
    (c) converting the detected wind direction in said database into a preselected symbol indicating the direction of the wind; and (d) electronically placing said wind symbols onto a visual map of the vicinity of the monitored site at their respective locations.

20. A visual display of odorous air inspection information in the vicinity of a monitored site, comprising: an online electronically Internet accessible visual map of the vicinity of a monitored site, said map containing symbolic representations of readings of odorous air inspection data taken at various locations in the vicinity of said site.

* * * * *